United States Patent [19]

Matsumoto et al.

[11] Patent Number: 4,523,386
[45] Date of Patent: Jun. 18, 1985

[54] HEADING DETECTING APPARATUS

[75] Inventors: Muneaki Matsumoto, Okazaki; Akira Kuno, Oobu; Koji Numata, Toyokawa, all of Japan

[73] Assignee: Nippon Soken, Inc., Nishio, Japan

[21] Appl. No.: 334,378

[22] Filed: Dec. 24, 1981

[30] Foreign Application Priority Data

Dec. 26, 1980 [JP] Japan .................................. 55-186268
Apr. 22, 1981 [JP] Japan .................................. 56-61826

[51] Int. Cl.³ ............................................. G01C 17/38
[52] U.S. Cl. ......................................... 33/357; 33/356
[58] Field of Search ..................... 33/357, 356, 355 R, 33/358, 363 R

[56] References Cited

U.S. PATENT DOCUMENTS 4,091,543  5/1978  Lapeyre .................................. 33/356

Primary Examiner—Willis Little
Attorney, Agent, or Firm—Cushman, Darby & Cushman

[57] ABSTRACT

A heading detecting apparatus of the type which is installed in a roof of a vehicle including a magnetic member (a steel body) capable of having a remanence and includes a heading sensor positioned near the magnetic member, whereby the apparatus detects the terrestrial magnetism and thereby detects the forward heading of the moving objects the apparatus includes a permeability member positioned between the magnetic member and the heading sensor so as to reduce the effect of the remanence of the magnetic member on the detection of the terrestrial magnetism by the heading sensor.

11 Claims, 5 Drawing Figures

HEADING DETECTING APPARATUS

RELATED REFERENCE

U.S. Ser. No. 133,922 filed Mar. 25, 1980 which was assigned to the same assignee is a copending application of this application.

BACKGROUND OF THE INVENTION

The present invention relates to a heading detecting apparatus including a heading sensor for sensing the earth's magnetic field to thereby determine the forward heading of a moving object.

Conventionally, it has been the practice that when such a heading detecting apparatus is installed in a vehicle, the magnetic field distortion caused by the remanence or residual magnetism of the vehicle, etc., is compensated for by any externally mounted compensating magnets to thereby accurately detect the vehicle heading.

With the known construction, however, it is necessary to give considerations from various aspects such as the location, number and strength of compensating magnets mounted externally to cancel the magnetic field distortion caused by the remanence of a vehicle, etc., thus complicating the required compensation. Also, the field distortion characteristic varies with different vehicles making it necessary to provide a different compensation for each of the vehicles. Further, measures must be considered to deal with changes in the vehicle field distortion characteristic during use.

SUMMARY OF THE INVENTION

The present invention has been made to overcome the foregoing deficiencies in the prior art, and it is the primary object of the present invention to provide a heading detecting apparatus in which a material having permeability is placed between a heading sensor and a magnetic member having a remanence thus making it possible to accurately detect the forward heading of a moving object without using any externally mounted compensating magnet to provide magnetic field compensation.

In accordance with the present invention there is thus a great advantage that due to the provision of a material having permeability between a magnetic member having a remanence and a heading sensor positioned near the magnetic member to detect the earth's magnetic field and thereby to detect the forward heading of a moving object, the effect of the remanence of the magnetic member on the detection of the terrestrial magnetism by the heading sensor is reduced considerably and thus the forward heading of the moving object can be detected accurately without using any external compensating magnet to provide magnetic field compensation.

DESCRIPTION OF PREFERRED EMBODIMENTS

The present invention will now be described in detail with reference to the illustrated embodiments.

Figure 1:
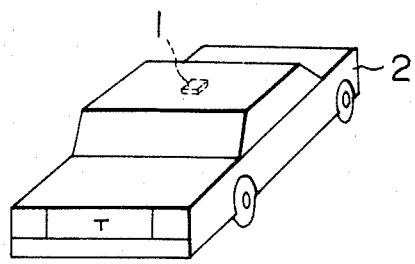
FIG. 1 is a perspective view showing a case in which a heading sensor is mounted in the roof portion of a vehicle.
Figure 2:
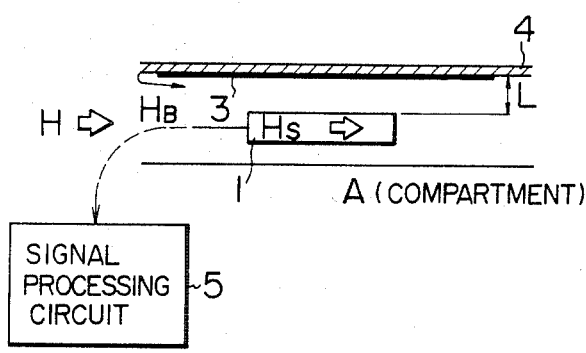
FIG. 2 is a schematic view showing a first embodiment of the invention.

FIG. 1 is a perspective view showing a case where a heading sensor 1 is mounted in the roof portion of a vehicle 2. FIG. 2 is a schematic view showing a first embodiment of the invention in which a material 3 having a high permeability (e.g., an amorphous alloy or permalloy) is put on a roof steel plate 4 of the vehicle 2 on the inner side of the vehicle compartment (designated at A in the Figure), and the heading sensor 1 is mounted on the inner side of the material 3 at a distance L apart by means of a suitable attachment (not shown). Note that a heat insulating material is provided between the roof steel plate 4 and the vehicle compartment A and the heading sensor 1 is positioned therebetween. The detection signal from the heading sensor 1 is sent to a signal processing circuit 5 provided inside the vehicle compartment A so that the signal is processed and the vehicle heading is detected.

Assuming now that H represents the external parallel magnetic field strength and $H_B$ represents the remanence strength of the roof steel plate 4, then the strength $H_S$ of the magnetic field passing through the heading sensor 1 is given by $$H_S = K_1 H + K_2 H_B = H_1 + H_2$$

$$(H_1 = K_1 H, H_2 = K_2 H_B)$$

Here, $K_1$ is a value which is dependent on the permeabilities of the roof steel plate 4 and the high permeability material 3 and the distance L and it is assumed that $K_1 H$ represents the external magnetic field component $H_1$. Also, $K_2$ is a value which is dependent on the permeability of the high permeability material 3 and the distance L and it is assumed that $K_2 H_B$ represents the remanence component $H_2$.

Where the distance L was selected at 3 mm, the ratio (S/N ratio) of the external magnetic field component $H_1$ to the remanence component $H_2$ or the disturbance without the high permeability material 3 was 1.1, the S/N ratio obtained by interposing, as shown in FIG. 2, the high permeability material 3 made of amorphous alloy and having a size of about 6 times the heading sensor 1 was 11 thus this value was about 10 times the former value.

On the other hand, while the remanence component $H_2$ did not vary much with increase in the distance L between the heading sensor 1 and the roof steel plate 4, the external magnetic field component $H_1$ increased with the result that when the distance L was 20 mm, the S/N ratio without the high permeability material 3 was 2.1 and the S/N ratio with the provision of the high permeability material 3 (amorphous alloy) was 15 showing the effect of increasing the ratio by about 7.5 times.

Figure 3:
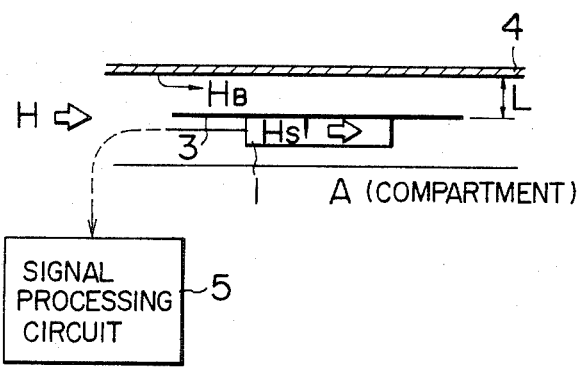
FIG. 3 is a schematic view showing a second embodiment of the invention.

Referring now to FIG. 3 showing a second embodiment of the invention, the high permeability material 3 is attached to the heading sensor 1 which is mounted inside the vehicle compartment A at the distance L apart from the roof steel plate 4 of the vehicle 2. Assuming now that H represents the external parallel magnetic field strength, $H_B$ represents the remanence strength of the roof steel plate 4 and $H_S'$ represents the strength of
} the magnetic field passing through the heading sensor 1, then the field strength $H_S'$ is given by $$H_S' = K_1'H + K_2'H_B = H_1' + H_2'$$

$$(H_1' = K_1'H, H_2' = K_2'H_B)$$

Here, since the permeability of the roof steel plate 4 is high (about 100 times), $K_1'$ is a value which is substantially dependent only on the permeability of the high permeability material 3 and the external magnetic field component $H_1'$ is represented by $K_1'H$. On the other hand, $K_2'$ is a value which is dependent on the permeability of the high permeability material 3 and the distance L and the remanence component $H_2'$ is represented by $K_2'H_B$. When the high permeability material 3 made of an amorphous alloy and having a size of about 4 times the heading sensor 1 was attached to the heading sensor 1 and the distance L was 3 mm, the ratio (S/N ratio) of the external magnetic field component $H_1'$ to the remanence component $H_2'$ forming a disturbance was 10.5. Also, both the external magnetic field component $H_1'$ and the remanence component $H_2'$ do not vary much with increase in the distance L and it is possible to obtain an S/N ratio which is substantially constant irrespective of the distance L.

Figure 4:
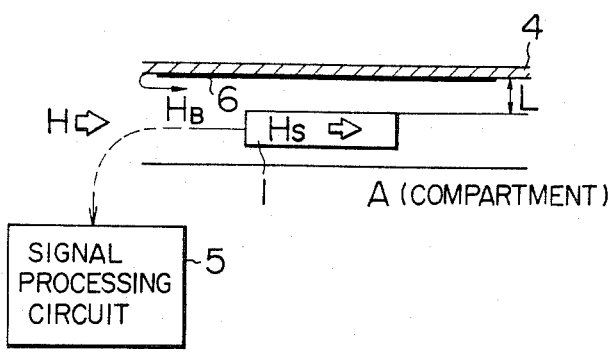
FIG. 4 is a schematic view showing a third embodiment of the invention.

FIG. 4 is a schematic view showing a third embodiment of the invention, in which attached to the inner side of the vehicle compartment (shown at A in the Figure) is a material 6 (e.g., silicon steel or low carbon steel) which is not subject to magnetic saturation by the terrestrial magnetism and which has a high permeability as compared with the roof steel plate 4 forming a first magnetic member, and the heading sensor 1 is mounted on the inner side of the material 6 at the distance L apart therefrom. The third embodiment differs from the first embodiment in that while, in the first embodiment, the high permeability material is placed between the heading sensor and the first magnetic member having a remanence, in the third embodiment the permeability material or a second magnetic member which magnetically shields the first magnetic member and which is not subject to saturation by the terrestrial magnetism is placed between the heading sensor and the first magnetic member. Also, like in the case of the first embodiment, a heat insulating material is placed between the roof steel plate 4 and the vehicle compartment A and the heading sensor 1 is arranged therebetween. The detection signal from the heading sensor 1 is sent to the signal processing circuit 5 provided inside the vehicle compartment A so that the signal is processed and the vehicle heading is detected.

Assuming now that H represents the external parallel magnetic field strength and $H_B$ represents the remanence strength of the roof steel plate 4, then the strength $H_S$ of the magnetic field passing through the heading sensor 1 is given by $$H_S = K_1H + K_2H_B = H_1 + H_2$$

$$(H_1 = K_1H, H_2 = K_2H_B).$$

Here, $K_1$ is a value which is dependent on the permeability of the roof steel plate 4 and the permeability material 6, respectively, and the distance L, and the external magnetic field component $H_1$ is represented by $K_1H$. Also, $K_2$ is a value which is dependent on the permeability of the permeability material 6 and the distance L, and the remanence component $H_2$ is represented by $K_2H_B$.

With the distance L selected at 5 mm, the ratio (S/N ratio) of the external magnetic field component $H_1$ to the remanence component $H_2$ forming a disturbance was 0.89 when the permeability material 6 was not interposed, whereas when the permeability material 6 made of silicon steel (S12, 0.35 mm thick) and having a size of about 4 times the heading sensor 1 was interposed, as shown in FIG. 4, the resulting S/N ratio was 2.6 showing an improvement by about 3 times. Also, when the permeability material 6 comprising a low carbon steel (S10C, 0.6 mm thick) was used in the same manner as the silicon steel, the resulting S/N ratio was 4.03 showing an improvement by about 4.5.

On the other hand, as the distance L between the heading sensor 1 and the roof steel plate 4 was increased, the remanence component $H_2$ did not vary much but the external magnetic field component $H_1$ increased. Thus, with the distance L being selected at 20 mm, the resulting S/N ratio without the permeability material 6 was 1.4, while the S/N ratio was 4.5 when the permeability material 6 comprising silicon steel was used and 6.3 when the permeability material 6 comprising low carbon steel was used, showing the effect of improving the ratio by 3.3 and 4.6 times, respectively.

The results of detection of eight headings, by the signal processing circuit 5, showed that the heading indication error was 40.5° with the distance L=5 mm and without the permeability material 6, whereas the error was 11° when the permeability material 6 comprising silicon steel was used and 11.5° when the permeability material 6 comprising low carbon steel was used, thus reducing the heading indication error to about ¼. Also, the error due to the rotational direction of the heading sensor 1 or the hysteresis was about 2° in the two cases. When the permeability material 6 comprising a high permeability amorphous alloy (which is subject to magnetic saturation by the earth's magnetic field) was used, the resulting heading indication error and hysteresis were 9° and 15.5°, respectively. It will thus be understood that the heading indication error decreases with increase in the permeability but the tendency of magnetic saturation increases with increase in the permeability, and thus if the magnetic saturation is caused by the terrestrial magnetism, the hysteresis due to the rotational direction of the heading sensor 1 is caused.

From the foregoing it will be understood that in order that the heading indication error and hysteresis may be reduced as far as possible, the permeability material 6 can advantageously comprise a material with as high a permeability as possible compared with the roof steel plate 4 of the vehicle 2 and not subject to magnetic saturation, such as, silicon steel or low carbon steel.

Figure 5:
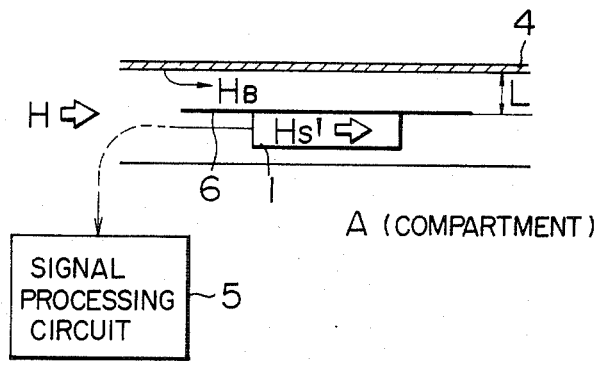
FIG. 5 is a schematic view showing a fourth embodiment of the invention.

Referring now to FIG. 5, there is illustrated a schematic view showing a fourth embodiment of the invention which is a modification of the third embodiment. In this fourth embodiment, the permeability material 6 is attached to the heading sensor 1 which in turn is mounted on the vehicle compartment A side at the distance L apart from the roof steel plate 4 of the vehicle 2. It should be apparent that by thus attaching the permeability material 6 to the heading sensor 1, it is possible to form them into integral sensor means and also attain the same effect as the case where the permeability material 6 is attached to the roof steel plate 4.

We claim:

1. In a heading detecting apparatus for detecting the forward heading of a vehicle having a magnetic member extending generally parallel to the ground and being capable of having a remanence, the improvement in said apparatus comprising the combination of:
   a heading sensor for detecting the terrestrial magnetism and providing an output signal representing the direction thereof,
   said sensor being adapted for disposition spacedly adjacent said magnetic member and therefore due to said remanence being subject to error in detecting said direction accurately;
   means for magnetically shielding said heading sensor from said magnetic member including a permeability member disposed adjacent said sensor for disposition between and parallel to said magnetic member and said heading sensor for causing a portion of said remanence to pass through said permeability member thereby reducing the amount of said remanence which passes through said heading sensor so that said heading sensor more accurately detects the terrestrial magnetism direction; and
   signal processing means connected to receive said output signal for developing there from an accurate indication of the heading direction of said vehicle.

2. An apparatus according to claim 1, wherein said permeability member is a high permeability member.

3. An apparatus according to claim 2, wherein said high permeability member is attached to said magnetic member.

4. An apparatus according to claim 2, wherein said high permeability member is positioned at a distance apart from said magnetic member, and wherein said high permeability member is attached to said heading sensor.

5. An apparatus according to claim 1, wherein said permeability member is a second magnetic member which magnetically shields the remanence of said first-mentioned magnetic member and which is not magnetically saturable by the terrestrial magnetism.

6. An apparatus according to claim 5, wherein said second magnetic member is higher in permeability than said first magnetic member having the remanence.

7. An apparatus according to claim 5 or 6, wherein said second magnetic member is attached to said first magnetic member, and wherein said heading sensor is positioned at a distance apart from said second magnetic member.

8. An apparatus according to claim 5 or 6, wherein said second magnetic member is positioned at a distance apart from said first magnetic member, and wherein said second magnetic member is attached to said heading sensor.

9. An apparatus according to claim 1, wherein said permeability member is made of any one selected from amorphous alloy, permalloy, silicon steel, and low carbon steel.

10. Apparatus as in claim 1 wherein said magnetic member is plate shaped and said permeability member is a plate having a width wider than a corresponding width of said heading sensor.

11. Apparatus as in claim 1 in combination with said vehicle, said vehicle having a roof at least a part of which is said magnetic member, said combination including means for supporting said sensor underneath said magnetic member.

* * * * *